(12) United States Patent
Kwon et al.

(10) Patent No.: US 9,709,466 B2
(45) Date of Patent: Jul. 18, 2017

(54) SYSTEMS AND METHODS FOR IGNITION SOURCE TESTING WITH FLAMMABLE FOAM

(71) Applicant: The Boeing Company, Huntington Beach, CA (US)

(72) Inventors: Eddie Kwon, Seattle, WA (US); Jason S. Damazo, Seattle, WA (US)

(73) Assignee: The Boeing Company, Chicago, IL (US)

(*) Notice: Subject to any disclaimer, the term of this patent is extended or adjusted under 35 U.S.C. 154(b) by 382 days.

(21) Appl. No.: 14/460,071

(22) Filed: Aug. 14, 2014

(65) Prior Publication Data

US 2016/0047719 A1  Feb. 18, 2016

(51) Int. Cl.
*G01N 19/00* (2006.01)
*G01M 99/00* (2011.01)

(52) U.S. Cl.
CPC .................. *G01M 99/002* (2013.01)

(58) Field of Classification Search
CPC .................................................. G01M 99/002
USPC ......... 73/35.14, 35.17, 118.03, 865.6, 865.9, 73/866
See application file for complete search history.

(56) References Cited

U.S. PATENT DOCUMENTS

| | | | | |
|---|---|---|---|---|
| 6,181,250 B1* | 1/2001 | Brooks, Jr. | .......... | G08B 17/117 340/577 |
| 2003/0179095 A1* | 9/2003 | Opitz | .................. | G08B 29/145 340/578 |
| 2004/0060118 A1* | 4/2004 | Diaz | .................... | A47C 27/003 5/698 |

OTHER PUBLICATIONS

Cahill, Patricia; "An Evaluation of the Flammability of Aircraft Wiring;" 2004.*
"Aircraft Lightning Test Methods," SAE Aerospace, ARP5416A, Section 7.7 Methods of Detection of Ignition Sources, pp. 99-105, Mar. 2005.

* cited by examiner

*Primary Examiner* — Benjamin Schmitt
(74) *Attorney, Agent, or Firm* — Dascenzo Intellectual Property Law, P.C.

(57) ABSTRACT

Systems and methods for ignition source testing with a flammable foam are disclosed. Flammable foam systems and methods for testing use a flammable foam that includes fuel and oxidant. Flammable foam is applied to a test article and an energy discharge is applied to the test article. Methods include determining whether the flammable foam ignited in response to the energy discharge.

20 Claims, 2 Drawing Sheets

SYSTEMS AND METHODS FOR IGNITION SOURCE TESTING WITH FLAMMABLE FOAM

FIELD

The present disclosure relates to systems and methods for ignition source testing with flammable foam.

BACKGROUND

In many situations, devices must operate in potentially hazardous conditions, such as where a fuel mixture may be ignited by uncontrolled operating or environmental conditions. For example, vehicles, including aerospace vehicles, typically operate with a fuel that must be maintained in a safe condition during storage and use. The ignition hazard should be minimized even when the vehicle is subject to uncontrolled events such as an accident, electrical malfunction, a lightning strike, or static electrical discharge. Other applications requiring ignition hazard consideration include fuel transport, fuel storage, mining operations, chemical processing, power plant construction and operation, and operations which involve combustible particulate such as sawdust, flour, and grain.

In the aerospace industry, lightning strikes of aircraft are a concern because they could result in electrical arcs and/or heating sufficient to ignite vaporous fuel mixtures. Though lightning passes through metallic aircraft virtually always without resulting harm, manufacturers and regulators are vigilant to the potential for harm. The Federal Aviation Authority (FAA) recognizes that arc energies as low as 200 µJ (microjoules) may be sufficient to cause unwanted ignition of vaporous fuels.

Design of apparatuses exposed to ignition hazards typically involves reducing the likelihood of ignition, containing the ignition hazard, and/or withstanding the ignition hazard. Test systems to facilitate and/or verify such designs typically use a test article, which is a model of the apparatus or a component of the apparatus, and subject the test article to an energy discharge that simulates and/or generates the potential hazard. For example, test systems may include a lightning strike simulator.

Test systems may determine the presence and/or effects of generated ignition sources by surrounding (and/or filling) a test article with a flammable gaseous mixture. If an ignition source is generated, the flammable mixture burns and the resulting light, sound, heat, pressure, etc. may be observed. Particularly important for this flammable mixture technique, the test article is enclosed by a test chamber that is configured to contain the flammable gas and resulting (potentially explosive) ignition. In part due to the safety concerns of working with large quantities of flammable gases, this technique requires specialized equipment, facilities, and highly trained personnel (and thus is costly and cumbersome).

The flammable mixture technique may be performed generally following one of two approaches: an open flow-through approach and a closed system approach. In the open flow-through approach, a test chamber is designed and built for the specific test article, mass flow controllers are used to flow specific ratios of gases to make a controlled flammable mixture within and/or around the test article, an environmental condition is induced on the test article, and then a pass/fail criteria is designated from the resulting no-ignition/ignition of the flammable environment in the test chamber. Inaccuracies in the flammable mixture composition, delivery, and flow yield uncertainties in the test results (small changes in the gas concentration results in a relatively large change in ignition threshold sensitivity). The uncertainty in the test forces an increased number of (typically costly) tests of (typically costly) test articles. Likewise, the validation process for this test approach is cumbersome and time consuming.

The closed system approach uses a closed/vacuum tight test chamber in which the chamber is pumped out and filled using the method of partial pressures to achieve highly accurate flammable gas mixtures (thus achieving consistent ignition sensitivity). The drawbacks to this approach include expensive test chambers, limited test article and test chamber sizes (due to both safety and cost), long test setup times (due to pumping and filling), and long preparation times (due to test chamber fabrication).

Further, design of large and complex apparatuses would be facilitated by testing larger and/or more representative test articles. However, testing larger articles with conventional techniques involves consequently larger test chambers and/or larger amounts of combustible material (such as fuel in the test article and/or flammable mixtures to detect ignition sources).

SUMMARY

Systems and methods for ignition source testing with a flammable foam are disclosed. Test systems comprise a flammable foam, a test article at least partially covered by the flammable foam, and an energy source configured to discharge energy into the test article. The flammable foam includes both a fuel and an oxidant sufficient to ignite in the presence of a suitable ignition source. Test methods comprise applying flammable foam to at least a portion of a surface of a test article, applying an energy discharge to the test article with the flammable foam, and determining whether the flammable foam ignited in response to the energy discharge.

DESCRIPTION

Figure 1:
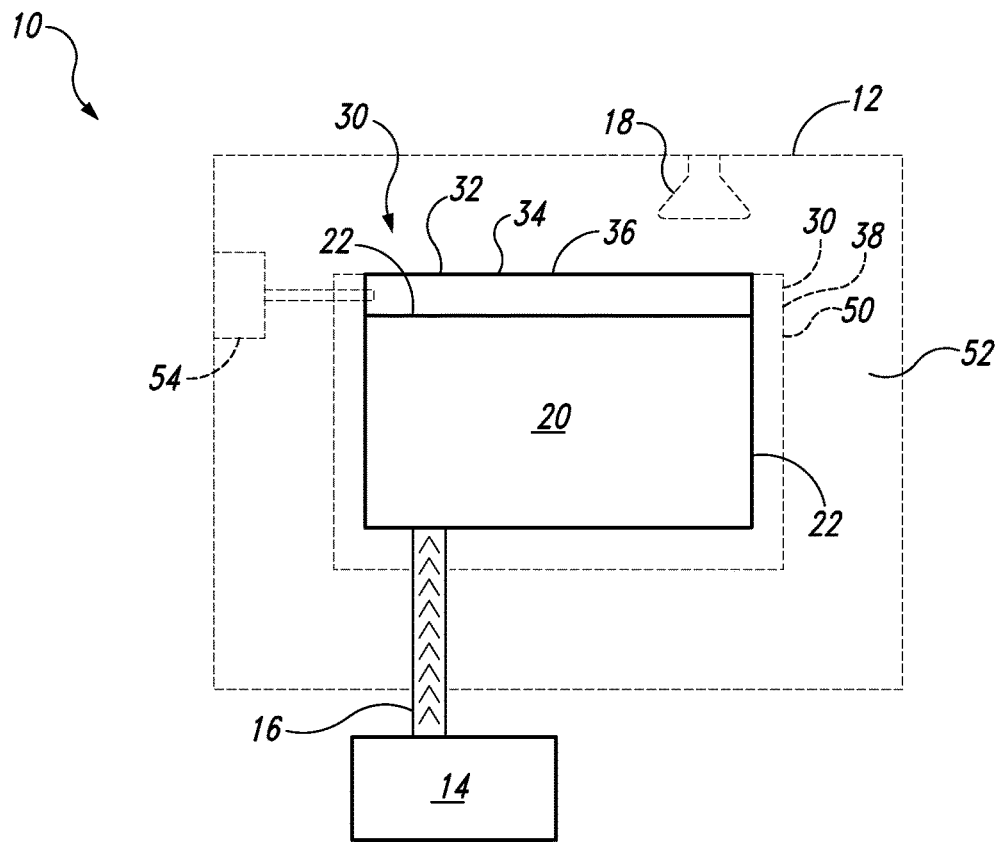
FIG. 1 is a schematic representation of a test system according to the present disclosure.

Systems and methods for ignition source testing with flammable foam are disclosed herein. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled in each of the figures, but reference numerals associated therewith may be used for consistency. Elements, components, and/or features that are discussed with reference to one or more of the figures may be included in and/or used with any of the figures without departing from the scope of the present disclosure.

FIG. 1 represents a test system 10 with a test article 20 prepared for testing by the application of a flammable foam 30. Generally, test systems 10 are configured to identify the presence of, and/or verify the absence of, ignition sources (e.g., ignition hazards) associated with equipment, devices, and/or apparatuses operated in a combustible environment and/or near combustible materials. More specifically, test systems 10 may be configured to detect ignition sources generated on the test article 20 by an energy discharge (generated by an energy source 14) that simulates actual and/or potential operating conditions and/or uncontrolled events. For example, the energy discharge may be a simulated lightning strike, heat, an electrical discharge, an electrical current, an electrical arc, and/or a combustion event (e.g., heat, flame, fire). Examples of ignition sources that may be generated include an electrical arc, a spark, a hot surface, a hot particle ejection, an electrostatic discharge, and a flame.

Test articles 20 may be equipment, devices, and/or apparatuses that may operate near combustible materials and/or in combustible environments where uncontrolled ignition sources could be hazardous. Test articles 20 also may be a portion, a component, and/or a model of such equipment, devices, and/or apparatuses. The equipment, devices, and/or apparatuses may be associated with one or many industries such as transportation, aerospace, chemical processing, petroleum production, mining, power production, forestry, and/or agriculture. For example, test articles 20 may be, may represent, and/or may be a component of a transport vehicle (e.g., a truck, an aircraft, a rocket), a fuel system, a fuel tank, a fuel gauge, a fuel pump, a ventilation system, a light, and/or an electrical enclosure.

Energy sources 14 are configured to discharge energy into, at, and/or to the test article 20 to test whether the discharged energy generates an ignition source on the test article 20. Energy sources 14 may be a simulated or actual operating condition such as a lightning strike, an electrical charge simulating static charge build-up, heat simulating environmental conditions (e.g., ambient operating conditions, proximate decomposition and/or combustion, and/or operation of a neighboring engine), and/or electromagnetic radiation simulating an operating environment). Energy sources 14 may include, and/or may be, a lightning simulator, a heater, a heat source, a flame, an electrical current source, and/or an electrical arc generator. Additionally or alternatively, energy sources 14 may include, and/or may be, a material (e.g., a gaseous material, a liquid material, and/or a solid material) undergoing combustion. In FIG. 1, the discharged energy is indicated by energy transmission 16. Energy transmission 16 may be via a conduit, a cable, and/or a conductor, and may span a gap between the energy source 14 and the test article 20.

Test systems 10 and/or energy sources 14 are configured to avoid directly igniting the flammable foam 30 with the energy discharge. In one arrangement, test systems 10 and/or energy sources 14 may be configured to apply the energy discharge to the test article 20 at an application site spaced apart from the flammable foam 30. For example, the application site may be remote from the flammable foam 30. As another example, test articles 20 may include a skin (e.g., a thin panel, a covering, a sheet, etc.) with two opposite faces (which may be fluidically isolated from one another). The flammable foam 30 may contact, cover, and/or be applied to at least a portion of one of the two opposite faces and the application site of the discharged energy may be on the other face. As yet another example, test articles 20 may include an exterior and/or an interior (which may be fluidically isolated from one another). The flammable foam 30 may contact, cover, and/or be applied to at least a portion of one of the exterior and interior and the application site of the discharged energy may be on the other side (exterior or interior). More specifically, the test article 20 may have an interior fluidically isolated from the exterior (e.g., a tank, a chamber, a canister, a vessel) with flammable foam 30 contacting, covering, and/or applied to the exterior (or a portion thereof) and a flammable gas and/or liquid at least partially filling the interior. Igniting the flammable gas and/or liquid discharges energy as the gas and/or liquid combusts. This energy is discharged to the interior of the test article 20 while the flammable foam 30 is on the exterior of the test article 20 to indicate whether the energy discharge creates any ignition sources near the flammable foam 30.

Figure 2:
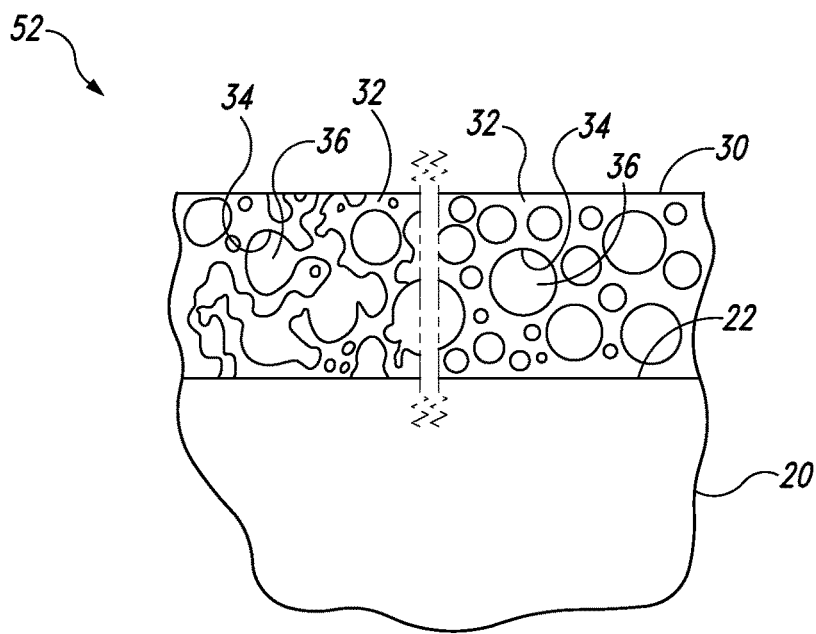
FIG. 2 is a schematic representation of a flammable foam according to the present disclosure applied to a test article.

As schematically detailed in FIG. 2, flammable foam 30 is a flammable material, i.e., a material that is easily ignitable and that readily combusts, and a foam, i.e., a material that includes a matrix 32 that defines and/or encloses one or more cells 34 (also called bubbles). The matrix 32 may include, and/or may be, a liquid and/or a solid. Flammable foams 30 may be open-celled foams (with one or more cells 34 that interconnect to form a fluidic path to the surface of the foam), as schematically represented on the left side of FIG. 2, and/or closed-cell foams (where substantially all cells 34 are fluidically isolated from the surface of the foam), as schematically represented on the right side of FIG. 2. Flammable foams 30 may include trapped gas 36, typically within the cells 34 of the flammable foam 30. Even where the flammable foam 30 is an open-cell foam, the flammable foam 30 may include a trapped gas 36 in one or more fluidically isolated cells 34 and/or in open cells 34. The configuration of the open cells 34 may be such that gas only slowly diffuses between the cells 34 and the ambient environment 52.

The cells 34 generally are small, numerous, and of various sizes (i.e., flammable foams 30 generally are polydisperse materials). The cells 34 may have an average effective diameter of greater than 10 µm (microns), greater than 50 µm, greater than 100 µm, greater than 200 µm, greater than 500 µm, greater than 1,000 µm, greater than 5,000 µm, greater than 10,000 µm, greater than 20,000 µm, less than 25,000 µm, less than 10,000 µm, less than 1,000 µm, and/or less than 500 µm. The total volume of the cells 34, and/or the trapped gas 36, may be larger than and/or substantially larger than the volume of the matrix 32. The fractional volume (as compared to the total volume of the flammable foam 30) of the cells 34 collectively, and/or the fractional volume of all trapped gas 36, may be greater than 50%, greater than 60%, greater than 70%, greater than 80%, greater than 90%, greater than 95%, greater than 98%, greater than 99%, greater than 99.5%, greater than 99.9%, less than 99.99%, less than 99.9%, less than 99.5%, less than 99%, less than 98%, and/or less than 95%.

Flammable foams 30 include at least one fuel and at least one oxidant (also called an oxidizer). Fuels are combustion fuels, i.e., any reactant that reacts with the oxidant by combustion. Fuels and oxidants may each independently be in one or more phases of matter (e.g., gas, liquid, solid). Generally, fuels and oxidants are gaseous and/or vaporous. Fuels may include, and/or may be, a hydrocarbon fuel, an engine fuel, a flammable gas, molecular hydrogen, methane, propane, gasoline, kerosene, wax, fatty acid, an aerosol, a suspension of liquid droplets, and/or a suspension of solid particles (e.g., dust, powder, and/or particulate). Oxidants may include, and/or may be, oxygen, air, molecular oxygen, nitrous oxide, and/or hydrogen peroxide.

Fuels and oxidants are portioned, configured and/or arranged to ignite and/or combust in the presence of an ignition source of appropriate energy and/or under appropriate conditions. Fuels and oxidants may be mixed and/or separated in the flammable foam 30. Where fuels and oxidants are mixed, the mixture is a flammable mixture. That is, fuels and oxidants are mixed in a proportion between the mixture's lower flammability limit (LFL) and upper flammability limit (UFL) for the given test temperature and pressure. For JP-4 jet fuel-air mixtures at 25° C. and 1 atmosphere pressure (about 100 kilopascals (kPa)), the lower flammability limit is about 1.3% fuel vapor by volume; lower than this, the mixture is too lean to ignite at this temperature and pressure. The upper flammability limit of JP-4 jet fuel-air mixtures is about 8% fuel vapor by volume; higher than this, the mixture is too rich to ignite at this temperature and pressure. Flammability limits for several fuel-air mixtures are listed in Table 1 (data from Zabetakis, Michael G., *Flammability characteristics of combustible gases and vapors*, U.S. Dept. of the Interior, Bureau of Mines, 1965). Even where fuels and oxidants are generally separated in the flammable foam 30, the ratio of fuel to oxidant may be substantially the same as for the corresponding flammable mixtures.

TABLE 1

Flammability limits of fuel-air mixtures at 25° C. and 1 atmosphere pressure; percentages given as volume percent of fuel vapor.

| Fuel | LFL | UFL |
| --- | --- | --- |
| Hydrogen | 4.0% | 75% |
| Methane | 5.0% | 15.0% |
| Propane | 2.1% | 9.5% |
| JP-4 Jet Fuel | 1.3% | 8% |

Fuels and/or oxidants may be partitioned to different, the same, and/or specific locations within the flammable foam 30. For example, the matrix 32 and/or the trapped gas 36 each may include at least one of the fuel and the oxidant. More specifically, the matrix 32 may include both fuel and oxidant; the trapped gas 36 may include both fuel and oxidant; and/or the matrix 32 may include one of the fuel and oxidant while the trapped gas 36 may include the other of the fuel and oxidant. Additionally or alternatively, the matrix 32 and/or the trapped gas 36 may include one or more chemical components (which may or may not be fuels, oxidants, and/or inert components). For example, the matrix 32 may include soap, detergent, surfactant, oil, and/or water. As another example, the trapped gas 36 may include a mixture of gases including fuels, oxidants, and/or inert gases (e.g., nitrogen, argon).

Owing at least primarily due to the presence of fuel and oxidant, flammable foams 30 are configured to ignite and/or combust in the presence of an ignition source, e.g., the flammable foam 30 may be configured to directly ignite in response to an ignition source, to continue to combust due to the ignition of the ignition source, and/or to combust in the presence of the ignition source. Flammable foams 30 may be configured to substantially completely react the fuel and/or the oxidant in response to the presence of the ignition source. Further, flammable foams may be configured to rapidly react (e.g., burn and/or explosively react) the fuel and the oxidant in response to the presence of the ignition source. The flammable foam 30, the matrix 32 and/or the trapped gas 36 may be electrically conductive or electrically insulating (non-conductive). Electrically conductive flammable foam 30, and/or components, may be configured to resistively heat and ignite due to electrical current transmitted through the foam by an ignition source. Electrically insulating flammable foam 30, and/or components, may be configured to electrically break down (e.g., to pass an arc) and ignite due to an electrical voltage across the foam, and/or component, generated by an ignition source.

Flammable foams 30 may be formulated, produced, and/or formed to ignite at or above a threshold ignition energy at suitable conditions. The threshold energy may be less than 1,000 µJ, less than 500 µJ, less than 300 µJ, less than 200 µJ, less than 150 µJ, less than 100 µJ, less than 50 µJ, greater than 10 µJ, greater than 50 µJ, greater than 100 µJ, greater than 150 µJ, greater than 200 µJ, about 50 µJ, about 100 µJ, about 150 µJ, about 200 µJ, and/or about 300 µJ. Suitable conditions may include standard pressure and temperature, reduced pressure and/or temperature as compared to standard pressure and temperature, and/or elevated pressure and/or temperature as compared to standard pressure and temperature corresponding to operating and/or storage conditions of the test article 20 (or equipment, devices, and/or apparatuses represented by the test article 20). Suitable conditions may simulate environments such as operating and/or storage conditions on the surface of the Earth (e.g., hot conditions in hot climates, cold conditions in cold climates), in the sky (e.g., cold and low pressure conditions at altitude), and/or below ground (e.g., hot conditions in tunnels). For example, suitable conditions may include a temperature of less than 200° C., less than 150° C., less than 100° C., less than 80° C., less than 50° C., less than 30° C., greater than −40° C., greater than −20° C., greater than 0° C., greater than 10° C., about 0° C., about 20° C., about 25° C., about 40° C., about 70° C., and/or about 100° C. Suitable conditions may include a pressure of greater than 10 kPa, greater than 20 kPa, greater than 50 kPa, greater than 90 kPa, greater than 100 kPa, less than 120 kPa, less than 100 kPa, less than 90 kPa, less than 50 kPa, less than 20 kPa, about 20 kPa, about 70 kPa, and/or about 100 kPa. The target ignition source may be, and/or may include, an electrical arc, a spark, a hot surface, a hot particle ejection, an electrostatic discharge, and a flame. The selection, mixture, distribution, and/or composition of the flammable foam 30 and its components may affect the threshold ignition energy. The ignition energy of a flammable foam 30 may be calibrated and/or verified by subjecting the flammable foam 30 to a controlled-energy ignition source such as a controlled electrical arc of a known ignition energy.

Returning to FIG. 1, flammable foams 30 are configured to cover a surface of the test article 20. Generally, flammable foams 30 are configured to form a gas-tight and/or fluid-tight barrier between the test article 20 (where the flammable foam 30 covers the test article 20) and an ambient environment 52 (e.g., a flammable environment, a reactive environment, an inert environment). Thus, flammable foams 30 may fluidically isolate the test article 20 from an ambient gas (e.g., air, molecular oxygen, a flammable gas, an inert gas, nitrogen, and/or argon). Some test systems 10 may include an optional test chamber 12 that encloses the test article 20. The test chamber 12 may be configured to contain and/or be filled with the ambient gas, and/or may be configured to isolate the test system 10, and/or components thereof, from outside influences and vice versa. For example, the test chamber 12 may be a gas-tight chamber, an electromagnetic shield and/or a safety shield.

Flammable foams 30 generally are configured with a consistency similar to shaving foam and/or whipped cream, i.e., with enough stiffness to be applied (e.g., spread) over a surface and enough resiliency to remain in place long enough to conduct an energy discharge test. Flammable foams 30 may be configured to remain in contact with the test article 20 for at least 1 minute, at least 2 minutes, at least 5 minutes, at least 10 minutes, at least 20 minutes, and/or at least 1 hour. Additionally or alternatively, test systems 10 may include a mechanism, such as a cover, a moat, a guide, and/or a dam, to retain the flammable foam 30 in contact with the test article 20. The flammable foam 30 may be considered to cease to be in contact with the test article 20 when a sufficient amount of fuel and/or oxidant seeps and/or leaks away (e.g., by cell 34 collapse, cell 34 breakage, and/or matrix 32 drainage) from the flammable foam 30 such that it is no longer flammable. Additionally or alternatively, the flammable foam 30 may be considered to cease to be in contact with the test article 20 when a region of the test article 20, originally covered by the flammable foam 30, is no longer covered by the flammable foam 30.

Flammable foams 30 may cover, contact, and/or be applied to a portion of the test article 20 (e.g., a surface 22 of the test article 20 and/or a portion of a surface 22). Further, flammable foams 30 may cover, contact, and/or be applied to selected portions (e.g., a pattern of portions) of the test article 20. The selected portions may be contiguous or non-contiguous. For example, flammable foam 30 may cover, contact, and/or be applied to one or more corners, edges, surfaces, connectors, fasteners, skins, inlets, outlets, and/or vents of the test article 20. Portions not in contact, not covered, and/or not having applied flammable foam 30 may be uncovered (e.g., the normal surface of the test article 20 is exposed to ambient conditions), exposed to an ambient gas (e.g., a flammable gas, an inert gas, and/or air), exposed to an ambient liquid (e.g., a flammable liquid, an inert liquid, and/or water), covered by a mask (e.g., a film, a coating, and/or a conformal material), and/or covered by a non-flammable foam 50 (e.g., an inert foam). In particular, known ignition sources on the test article 20 may be masked, isolated, covered, etc. by non-flammable materials and hence would not interfere with the testing of other regions of the test article 20. Additionally or alternatively, some portions of the test article 20 may be covered by, contacted by, and/or include one type of flammable foam 30 (e.g., a first flammable foam 30 with a first ignition threshold) while other portions of the test article 20 may be covered by, contacted by, and/or include a different type of flammable foam 30 (e.g., a second flammable foam 38 with a second ignition threshold).

Test systems 10 also may include a detector 18 configured to detect an ignition event (e.g., the ignition and/or combustion of the flammable foam 30). Detectors 18 may be configured to detect light, temperature, heat, sound, pressure, and/or electromagnetic radiation that results from an ignition event. Illustrative, non-exclusive examples of detectors 18 include cameras, optical detectors, temperature sensors, heat sensors, acoustic sensors, microphones, pressure sensors, and electrical detectors (e.g., a detector configured to sense AC current and/or voltage, and/or radio-frequency radiation).

Further, test systems 10 may include a controlled ignition source 54 configured to ignite and/or combust the flammable foam 30. Controlled ignition sources 54 may be used to verify the flammability and/or the ignition energy of the flammable foam 30. For example, after a test in which the flammable foam 30 was not ignited and/or not completely consumed by an ignition event, the controlled ignition source 54 may be used to verify a valid test condition (verifying that the flammable foam 30 is, in fact, flammable at the ignition energy threshold) and/or to consume unused flammable foam 30 that remains after a test. Controlled ignition sources 54 may include, and/or may be, a lightning simulator, a heater, a heat source, a flame, an electrical current source, and/or an electrical arc generator. Controlled ignition sources 54 may be configured to deliver a repeatable and/or calibrated energy discharge, and/or may be configured to deliver an energy discharge at, above, and/or below (e.g., within a range) a predetermined energy. For example, the energy discharge may be less than 1,000 µJ, less than 500 µJ, less than 300 µJ, less than 200 µJ, less than 150 µJ, less than 100 µJ, less than 50 µJ, greater than 10 µJ, greater than 50 µJ, greater than 100 µJ, greater than 150 µJ, greater than 200 µJ, about 50 µJ, about 100 µJ, about 150 µJ, about 200 µJ, and/or about 300 µJ.

Figure 3:
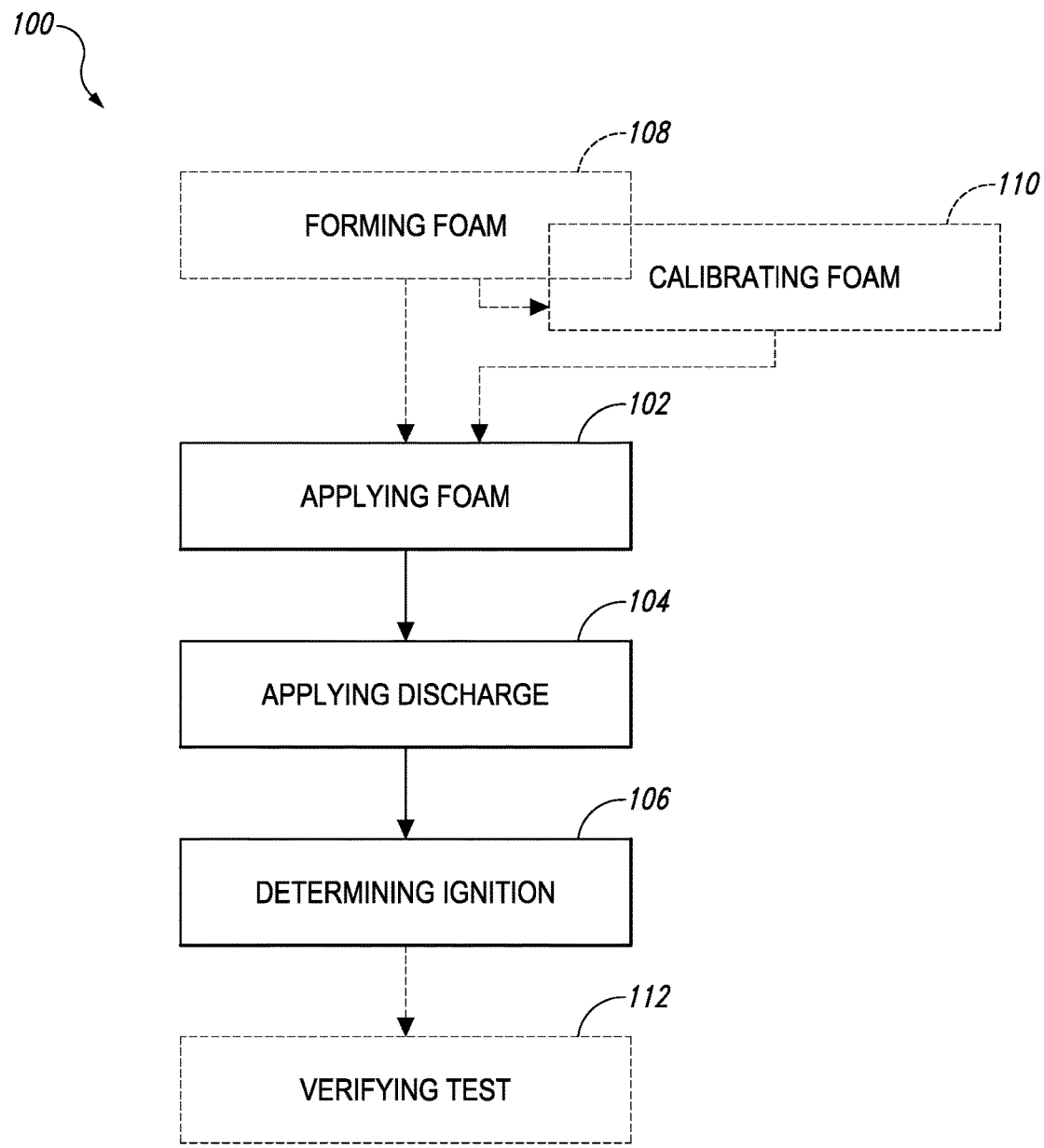
FIG. 3 is a schematic representation of testing methods according to the present disclosure.

In FIG. 3, methods 100 of testing a test article (e.g., test article 20) for potential ignition sources are presented. Methods 100 comprise applying 102 a flammable foam (e.g., flammable foam 30) to at least a portion of a surface (e.g., surface 22) of a test article, subsequently applying 104 an energy discharge to the test article 20, and subsequently determining 106 whether the flammable foam ignited in response to the energy discharge. Methods 100 may be methods of testing test articles for proper operation (e.g., verification of no generated ignition sources), for robustness to operation conditions (e.g., resilience to heat, motion, electrical discharge, etc.), and/or for robustness in failure conditions (e.g., due to accident, proximate fire, lightning strike, etc.).

Applying 102 the flammable foam may include covering and/or contacting the portion of the surface with flammable foam, and/or may include spreading and/or spraying flammable foam onto the portion of the surface. Applying 102 may include fluidically isolating, with the flammable foam, the portion of the surface of the test article from an ambient environment such as an ambient gas and/or an ambient liquid. Methods 100 may include surrounding at least a portion of the test article and/or the flammable foam on the test article with an ambient environment. For example, methods 100 may include enclosing at least a portion of the test article in a test chamber and filling the test chamber with an ambient gas and/or an ambient liquid.

Further, applying 102 may include applying flammable foam to specific and/or selected portions of the test article (such as the interior, the exterior, one or more faces of a skin, corners, edges, surfaces, connectors, fasteners, inlets, outlets, and/or vents). Where the flammable foam is applied only to a portion of the test article, other portions of the test article may remain uncovered, exposed, and/or free of flammable foam. Such portions may contact an ambient environment such as an ambient gas. For example, flammable foam may be applied to the exterior of the test article and the interior may be filled with ambient gas and/or liquid. As another example, flammable foam may be applied to one face of a skin and the other face may be contacted with an ambient gas and/or liquid. Additionally or alternatively, before, during, and/or after applying 102 the flammable foam, a portion of the test article may be masked, isolated, and/or covered by a mask as described herein. The mask may include non-flammable materials such as a non-flammable foam (e.g., an inert foam).

After applying 102 the flammable foam, methods 100 may include retaining the flammable foam in contact with the surface of the test article until at least applying 104 the energy discharge. Retaining may include using a cover, a moat, a guide, and/or a dam, to retain the flammable foam in contact with the test article.

Methods 100 comprise applying 104 the energy discharge, which generally includes subjecting the test article to an energy discharge that simulates actual and/or potential operating conditions and/or uncontrolled events (e.g., lightning, electrical malfunction, heat, combustion, etc.). The energy discharge may be applied by an energy source (e.g., energy source 14), and/or may be a simulated lightning strike, an electrical discharge, an electrical current, an electrical arc, and/or a combustion event. As illustrative, non-exclusive examples of combustion events, the energy discharge may be heat, flame and/or fire generated by igniting and/or combusting a combustible and/or flammable material (which may include, and/or may be, a solid, liquid, and/or gas), e.g., fuel such as kerosene, jet fuel, gasoline, and/or diesel fuel. Applying 104 the energy discharge may generate an ignition source at and/or along a surface of the test article (e.g., generated ignition sources may include, and/or may be, an electrical arc, a spark, a hot surface, a hot particle ejection, an electrostatic discharge, and/or a flame). Ignition sources, if any, generated by the applying 104 may ignite and/or combust the flammable foam locally and/or may cause a chain reaction that results in the combustion of a large fraction (e.g., a majority, substantially all, and/or all) of the flammable foam (or at least of contiguously connected flammable foam sections).

Applying 104 the energy discharge may be performed in a manner designed to avoid direct ignition and/or combustion of the flammable foam by the energy discharge. For example, the energy discharge may be applied to an application site on the test article that is spaced apart from the flammable foam. Such methods of applying the energy discharge include (a) applying flammable foam to just one of the interior and the exterior of the test article and thereafter applying the energy discharge to the other of the interior and the exterior, (b) applying flammable foam to just one face of a skin of the test article and thereafter applying the energy discharge to the other face of the skin, and (c) applying flammable foam while leaving an exposed portion of a surface of the test article and thereafter applying the energy discharge to the exposed portion. Other manners of avoiding direct ignition and/or combustion of the flammable foam by the energy discharge include conducting and/or transmitting the energy discharge to the test article without disturbing the flammable foam. Such methods of applying the energy discharge include applying an electrical current to the test article in order to heat a portion of the test article without conducting significant current through the flammable foam.

Methods 100 comprise determining 106 the result of the applying 104 the energy discharge. Determining 106 may include checking (e.g., visually inspecting and/or inspecting by machine vision) for the presence, and/or absence, of the flammable foam after applying 104. Determining 106 may be by observing, monitoring, and/or inspecting the flammable foam before, during, and/or after the applying 104 the energy discharge. In situations where the applying 104 generates an ignition source that ignites and/or combusts the flammable foam, determining 106 may include determining a point of origin of ignition of the flammable foam. The point of origin may be determined by optically monitoring the flammable foam on the test article while applying 104 the energy discharge. The point of origin of ignition is generally visible as the initial flame and/or spark. Additionally or alternatively, the point of origin of ignition may be determined by localized charring and/or consumption of flammable foam. Determining 106 and monitoring may be performed manually and/or automatically, and/or may include the use of a detector such as detector 18.

Methods 100 may comprise selecting a flammable foam such as flammable foam 30. The flammable foam may be selected to ignite and/or combust in the presence of an ignition source of appropriate energy and/or an ignition source that may be generated by the applying 104 the energy discharge (e.g., an electrical arc, a spark, a hot surface, a hot particle ejection, an electrostatic discharge, and/or a flame). For example, the flammable foam may be selected to ignite and/or combust in the presence of an ignition source with an ignition energy of less than 1,000 µJ, less than 500 µJ, less than 300 µJ, less than 200 µJ, less than 150 µJ, less than 100 µJ, less than 50 µJ, greater than 10 µJ, greater than 50 µJ, greater than 100 µJ, greater than 150 µJ, greater than 200 µJ, about 50 µJ, about 100 µJ, about 150 µJ, about 200 µJ, and/or about 300 µJ. Further, the selecting may include selecting a flammable foam that is configured to substantially completely, and/or rapidly, react the fuel and/or the oxidant in response to the presence of the ignition source.

Methods 100 may comprise forming 108 the flammable foam. The forming 108 may include mixing and/or contacting fuel and oxidant in a foam. For example, the forming 108 may include bubbling a gaseous mixture through a liquid solution. As another example, the forming 108 may include whipping, agitating, and/or frothing a liquid solution in the presence of, and/or with, a gaseous mixture. For both techniques, the gaseous mixture may be a mixture of fuel and oxidant, and the liquid solution may include at least one of soap, detergent, surfactant, oil, and water.

Further, forming 108 may include controlling the composition, portion, and/or distribution of fuel and oxidant within the flammable foam to produce a flammable foam that ignites at or above a consistent ignition energy threshold such as less than 1,000 µJ, less than 500 µJ, less than 300 µJ, less than 200 µJ, less than 150 µJ, less than 100 µJ, less than 50 µJ, greater than 10 µJ, greater than 50 µJ, greater than 100 µJ, greater than 150 µJ, greater than 200 µJ, about 50 µJ, about 100 µJ, about 150 µJ, about 200 µJ, and/or about 300 µJ. Forming 108 may include calibrating 110 and/or verifying the flammable foam formed, for example, by applying an ignition source to a sample of the flammable foam. The applied ignition source may be a controlled ignition source 54. Additionally or alternatively, calibrating 110 and/or verifying may be performed as a separate step after the forming 108. FIG. 3 indicates by overlapping boxes 108 and 110 that calibrating 110 may be an included element of forming 108 and/or may be a separate step.

After determining 106, in particular, determining that the flammable foam did not ignite in response to the applied energy discharge, methods 100 may include verifying 112 the validity of the test by igniting the flammable foam remaining on the test article. The verifying 112 may include using a controlled ignition source such as controlled ignition source 54.

After determining 106, whether determining the flammable foam ignited or not, methods 100 may include combusting any unreacted flammable foam, for example with a controlled ignition source such as controlled ignition source 54.

Methods 100 may be performed multiple times on a single test article and/or may be performed with multiple test articles, for example to determine and/or to reduce statistical and/or process effects.

Illustrative, non-exclusive examples of inventive subject matter according to the present disclosure are described in the following enumerated paragraphs.

A1. A testing method comprising:
applying a flammable foam to at least a portion of a surface of a test article, wherein the flammable foam includes a fuel and an oxidant;
applying an energy discharge to the test article with the flammable foam; and
determining whether the flammable foam ignited in response to the energy discharge.

A2. The testing method of paragraph A1, further comprising forming the flammable foam.

A2.1. The testing method of paragraph A2, wherein the forming includes mixing the fuel and the oxidant into a foam.

A2.2. The testing method of any of paragraphs A2-A2.1, wherein the forming includes contacting the fuel and the oxidant in a foam.

A2.3. The testing method of any of paragraphs A2-A2.2, wherein the forming includes bubbling a gaseous mixture of the fuel and the oxidant through a liquid solution to form the flammable foam, optionally wherein the liquid solution includes at least one of soap, detergent, surfactant, oil, and water.

A2.4. The testing method of any of paragraphs A2-A2.3, wherein the forming includes whipping, agitating, and/or frothing a liquid solution in the presence of, and/or with, a gaseous mixture of the fuel and the oxidant, optionally wherein the liquid solution includes at least one of soap, detergent, surfactant, oil, and water.

A3. The testing method of any of paragraphs A1-A2.4, wherein the applying the flammable foam includes covering and/or contacting the portion of the surface with the flammable foam.

A4. The testing method of any of paragraphs A1-A3, wherein the applying the flammable foam includes spreading and/or spraying the flammable foam onto the portion of the surface.

A5. The testing method of any of paragraphs A1-A4, wherein the test article has an interior and an exterior.

A5.1. The testing method of paragraph A5, wherein the applying the flammable foam includes applying the flammable foam to the exterior and/or the interior of the test article.

A5.2. The testing method of any of paragraphs A5-A5.1, wherein the applying the energy discharge includes applying the energy discharge to the exterior and/or the interior of the test article.

A5.3. The testing method of any of paragraphs A5-A5.2, wherein the applying the flammable foam includes applying the flammable foam to one of the exterior and the interior, and wherein the applying the energy discharge includes applying the energy discharge to the other of the exterior and the interior.

A6. The testing method of any of paragraphs A1-A5.3, wherein the flammable foam includes a matrix.

A6.1. The testing method of paragraph A6, wherein the matrix is at least one of a liquid matrix and a solid matrix.

A6.2. The testing method of any of paragraphs A6-A6.1, wherein the matrix includes a liquid and/or a solid.

A6.3. The testing method of any of paragraphs A6-A6.2, wherein the matrix includes at least one of the fuel and the oxidant.

A6.4. The testing method of any of paragraphs A6-A6.3, wherein the matrix is electrically conductive or electrically insulating.

A6.5. The testing method of any of paragraphs A6-A6.4, wherein the matrix includes at least one of a flammable material, a fatty acid, and a wax.

A6.6. The testing method of any of paragraphs A6-A6.5, wherein the matrix includes at least one of soap, detergent, surfactant, oil, and water.

A6.7. The testing method of any of paragraphs A6-A6.6, wherein the matrix defines and/or encloses a plurality of cells.

A7. The testing method of any of paragraphs A1-A6.7, wherein the flammable foam includes trapped gas, optionally wherein the trapped gas includes at least one of the fuel and the oxidant.

A7.1. The testing method of paragraph A7, wherein the trapped gas includes at least one of a hydrocarbon fuel, a flammable gas, molecular hydrogen, methane, propane, gasoline, and kerosene.

A7.2. The testing method of any of paragraphs A7-A7.1, wherein the trapped gas includes at least one of molecular oxygen and air.

A7.3. The testing method of any of paragraphs A7-A7.2, wherein the trapped gas includes a mixture of gases.

A8. The testing method of any of paragraphs A1-A7.3, wherein the flammable foam has a fractional volume of trapped gas of greater than 50%, greater than 60%, greater than 70%, greater than 80%, greater than 90%, greater than 95%, greater than 98%, greater than 99%, greater than 99.5%, greater than 99.9%, less than 99.99%, less than 99.9%, less than 99.5%, less than 99%, less than 98%, and/or less than 95%.

A9. The testing method of any of paragraphs A1-A8, wherein the flammable foam includes a plurality of fuels and/or a plurality of oxidants.

A10. The testing method of any of paragraphs A1-A9, wherein the fuel is a gas, a liquid, and/or a solid.

A11. The testing method of any of paragraphs A1-A10, wherein the oxidant is a gas, a liquid, and/or a solid.

A12. The testing method of any of paragraphs A1-A11, wherein the fuel includes, optionally is, at least one of a hydrocarbon fuel, a flammable gas, molecular hydrogen, methane, propane, gasoline, kerosene, wax, fatty acid, an aerosol, a suspension of liquid droplets, and a suspension of solid particles, optionally wherein the solid particles include and/or are at least one of dust, powder, and particulate.

A13. The testing method of any of paragraphs A1-A12, wherein the oxidant includes, optionally is, at least one of oxygen, air, molecular oxygen, nitrous oxide, and hydrogen peroxide.

A14. The testing method of any of paragraphs A1-A13, wherein the flammable foam is configured to remain in contact with the surface until the applying the energy discharge.

A15. The testing method of any of paragraphs A1-A14, further comprising, after the applying the flammable foam, retaining the flammable foam in contact with the surface until the applying the energy discharge.

A16. The testing method of any of paragraphs A1-A15, wherein the flammable foam is a closed-cell foam and/or an open-cell foam.

A17. The testing method of any of paragraphs A1-A16, wherein the flammable foam includes a plurality of cells, wherein an average effective diameter of the cells is greater than 10 µm, greater than 50 µm, greater than 100 µm, greater than 200 µm, greater than 500 µm, greater than 1,000 µm, greater than 5,000 µm, greater than 10,000 µm, greater than 20,000 µm, less than 25,000 µm, less than 10,000 µm, less than 1,000 µm, and/or less than 500 µm, and optionally wherein the plurality of cells include trapped gas.

A18. The testing method of any of paragraphs A1-A17, wherein the applying the energy discharge includes applying at least one of a simulated lightning strike, an electrical discharge, an electrical arc, and heat to the test article.

A19. The testing method of any of paragraphs A1-A18, wherein the applying the energy discharge includes applying the energy discharge to the test article at an application site spaced apart from the flammable foam.

A20. The testing method of any of paragraphs A1-A19, wherein the test article includes a skin with two faces, wherein the applying the flammable foam includes applying flammable foam to one of the faces of the skin, and wherein the applying the energy discharge includes applying the energy discharge to the other face of the skin.

A21. The testing method of any of paragraphs A1-A20, wherein the applying the energy discharge includes combusting a material at an application site spaced apart from the flammable foam, wherein the material includes, optionally is, at least one of a gaseous material, a liquid material, and a solid material.

A22. The testing method of any of paragraphs A1-A21, further comprising contacting an application site, fluidically isolated from the flammable foam, with a flammable mixture, and wherein the applying the energy discharge includes igniting the flammable mixture, optionally wherein the flammable mixture includes, or is, at least one of a gaseous mixture and a liquid mixture.

A23. The testing method of any of paragraphs A1-A22, wherein the applying the energy discharge includes creating an ignition source along the portion of the surface of the test article.

A23.1. The testing method of paragraph A23, wherein the ignition source has an energy of less than 1,000 µJ, less than 500 µJ, less than 300 µJ, less than 200 µJ, less than 150 µJ, less than 100 µJ, less than 50 µJ, greater than 10 µJ, greater than 50 µJ, greater than 100 µJ, greater than 150 µJ, greater than 200 µJ, about 50 µJ, about 100 µJ, about 150 µJ, about 200 µJ, and/or about 300 µJ.

A23.2. The testing method of any of paragraphs A23-A23.1, wherein the ignition source includes, optionally is, at least one of an electrical arc, a spark, a hot surface, a hot particle ejection, an electrostatic discharge, and a flame.

A24. The testing method of any of paragraphs A1-A23.2, wherein the applying the flammable foam includes fluidically isolating, with the flammable foam, the portion of the surface from an ambient gas.

A24.1. The testing method of paragraph A24, wherein the ambient gas includes, optionally is, at least one of air, molecular oxygen, a flammable gas, an inert gas, nitrogen, and argon.

A24.2. The testing method of any of paragraphs A24-A24.1, further comprising enclosing at least a portion of the test article in a test chamber, and filling the test chamber with the ambient gas.

A25. The testing method of any of paragraphs A1-A24.2, wherein the applying the flammable foam includes selectively applying the flammable foam to one or more portions of one or more surfaces of the test article.

A26. The testing method of any of paragraphs A1-A25, wherein the applying the flammable foam includes applying the flammable foam to a first portion of the surface of the test article and leaving a second portion of the surface of the test article free of flammable foam.

A27. The testing method of any of paragraphs A1-A26, wherein the portion of the surface of the test article is a first portion, and further comprising masking a second portion of the surface of the test article to avoid contact with the flammable foam, optionally before, during, and/or after the applying the flammable foam.

A28. The testing method of any of paragraphs A1-A27, wherein the portion of the surface of the test article is a first portion, and further comprising applying a non-flammable foam to a second portion of the surface of the test article, optionally wherein the non-flammable foam is an inert foam.

A29. The testing method of any of paragraphs A1-A28, wherein the determining includes checking for the presence, and/or absence, of the flammable foam at the portion of the surface of the test article.

A30. The testing method of any of paragraphs A1-A29, wherein the determining includes determining a point of origin of ignition of the flammable foam.

A31. The testing method of any of paragraphs A1-A30, wherein the determining includes monitoring the test article while applying the energy discharge.

A31.1. The testing method of paragraph A31, wherein monitoring includes monitoring with at least one of a camera, a heat sensor, a temperature sensor, a pressure sensor, and an acoustic sensor.

A32. The testing method of any of paragraphs A1-A31.1, further comprising selecting flammable foam that is configured to ignite and/or combust in the presence of an ignition source.

A32.1. The testing method of paragraph A32, wherein the ignition source has an energy of less than 1,000 µJ, less than 500 µJ, less than 300 µJ, less than 200 µJ, less than 150 µJ, less than 100 µJ, less than 50 µJ, greater than 10 µJ, greater than 50 µJ, greater than 100 µJ, greater than 150 µJ, greater than 200 µJ, about 50 µJ, about 100 µJ, about 150 µJ, about 200 µJ, and/or about 300 µJ.

A32.2. The testing method of any of paragraphs A32-A32.1, wherein the ignition source includes, optionally is, at least one of an electrical arc, a spark, a hot surface, a hot particle ejection, an electrostatic discharge, and a flame.

A32.3. The testing method of any of paragraphs A32-A32.2, wherein the selecting includes selecting flammable foam that is configured to substantially completely react at least one of the fuel and the oxidant in response to the presence of the ignition source.

A32.4. The testing method of any of paragraphs A32-A32.3, wherein the selecting includes selecting flammable foam that is configured to rapidly react the fuel and the oxidant in response to the presence of the ignition source.

A33. The testing method of any of paragraphs A1-A32.4, further comprising verifying that the flammable foam ignites in the presence of a controlled ignition source.

A33.1. The testing method of paragraph A33, wherein the verifying includes igniting the flammable foam with the controlled ignition source.

A33.2. The testing method of any of paragraphs A33-A33.1, wherein the verifying includes igniting a sample of the flammable foam with the controlled ignition source.

A33.3. The testing method of any of paragraphs A33-A33.2, wherein the verifying is performed after the determining.

A33.4. The testing method of any of paragraphs A33-A33.3, wherein the controlled ignition source delivers an energy of less than 1,000 µJ, less than 500 µJ, less than 300

μJ, less than 200 μJ, less than 150 μJ, less than 100 μJ, less than 50 μJ, greater than 10 μJ, greater than 50 μJ, greater than 100 μJ, greater than 150 μJ, greater than 200 μJ, about 50 μJ, about 100 μJ, about 150 μJ, about 200 μJ, and/or about 300 μJ.

A33.5. The testing method of any of paragraphs A33-A33.4, wherein the controlled ignition source includes, optionally is, at least one of an electrical arc, a spark, a hot surface, a hot particle ejection, an electrostatic discharge, and a flame.

A34. The testing method of any of paragraphs A1-A33.5, further comprising, after the determining, combusting any unreacted flammable foam in contact with the test article by igniting the unreacted flammable foam with a controlled ignition source.

A34.1. The testing method of paragraph A34, wherein the controlled ignition source delivers an energy of less than 1,000 μJ, less than 500 μJ, less than 300 μJ, less than 200 μJ, less than 150 μJ, less than 100 μJ, less than 50 μJ, greater than 10 μJ, greater than 50 μJ, greater than 100 μJ, greater than 150 μJ, greater than 200 μJ, about 50 μJ, about 100 μJ, about 150 μJ, about 200 μJ, and/or about 300 μJ.

A34.2. The testing method of any of paragraphs A34-A34.1, wherein the controlled ignition source includes, optionally is, at least one of an electrical arc, a spark, a hot surface, a hot particle ejection, an electrostatic discharge, and a flame.

A35. The testing method of any of paragraphs A1-A34.2, wherein the test article is an aerospace component, and optionally at least one of a fuel system, a fuel system component, a fuel tank, a fuel gauge, a fuel pump, an electrical enclosure, and a wing.

A36. The testing method of any of paragraphs A1-A35, wherein the testing method is an ignition hazard testing method.

A37. The testing method of any of paragraphs A1-A36, wherein the testing method comprises using, creating, and/or forming the test system of any of paragraphs B1-B20.

A38. The testing method of any of paragraphs A1-A37, wherein the flammable foam is the flammable foam of any of paragraphs C1-C21.4.

B1. A test system, optionally an aerospace component test system, comprising:
a flammable foam that includes a fuel and an oxidant;
a test article at least partially covered by the flammable foam; and
an energy source configured to discharge energy into the test article.

B2. The test system of paragraph B1, wherein the test system is configured to detect ignition sources generated on the test article by an energy discharge from the energy source.

B2.1. The test system of paragraph B2, wherein the ignition source includes, optionally is, at least one of an electrical arc, a spark, a hot surface, a hot particle ejection, an electrostatic discharge, and a flame.

B2.2. The test system of any of paragraphs B2-B2.1, wherein the energy discharge is at least one of a simulated lightning strike, an electrical current, an electrical arc, and a combustion event.

B3. The test system of any of paragraphs B1-B2.2, wherein the test article has an interior and an exterior.

B3.1. The test system of paragraph B3, wherein the flammable foam covers at least a portion of the exterior and/or the interior of the test article.

B3.2. The test system of any of paragraphs B3-B3.1, wherein the energy source is configured to discharge energy to the exterior and/or the interior of the test article.

B3.3. The test system of any of paragraphs B3-B3.2, wherein the flammable foam covers at least a portion of one of the exterior and the interior, and wherein the energy source is configured to discharge energy to the other of the exterior and the interior.

B3.4. The test system of any of paragraphs B3-B3.3, wherein the interior of the test article is at least partially filled with a flammable gas and/or a flammable liquid, and wherein the flammable foam covers at least a portion of the exterior of the test article, and optionally wherein the exterior is fluidically isolated from the interior.

B4. The test system of any of paragraphs B1-B3.4, wherein the fuel is a gas, a liquid, and/or a solid.

B5. The test system of any of paragraphs B1-B4, wherein the oxidant is a gas, a liquid, and/or a solid.

B6. The test system of any of paragraphs B1-B5, wherein the fuel includes, optionally is, at least one of a hydrocarbon fuel, a flammable gas, molecular hydrogen, methane, propane, gasoline, kerosene, wax, fatty acid, an aerosol, a suspension of liquid droplets, and a suspension of solid particles, optionally wherein the solid particles include and/or are at least one of dust, powder, and particulate.

B7. The test system of any of paragraphs B1-B6, wherein the oxidant includes, optionally is, at least one of oxygen, air, molecular oxygen, nitrous oxide, and hydrogen peroxide.

B8. The test system of any of paragraphs B1-B7, wherein the flammable foam is configured to remain in contact with the test article for at least 1 minute, at least 2 minutes, at least 5 minutes, at least 10 minutes, at least 20 minutes, and/or at least 1 hour.

B9. The test system of any of paragraphs B1-B8, wherein the energy source includes, optionally is, at least one of a lightning simulator, a heater, a heat source, a flame, an electrical current source, and an electrical arc generator.

B10. The test system of any of paragraphs B1-B9, wherein the energy source is configured to apply an energy discharge to the test article at an application site spaced apart from the flammable foam.

B11. The test system of any of paragraphs B1-B10, wherein the test article includes a skin with two faces, wherein the flammable foam covers at least a portion of one of the faces of the skin, and wherein the energy source is configured to apply an energy discharge to the other face of the skin.

B12. The test system of any of paragraphs B1-B11, wherein the energy source includes a material undergoing combustion at an application site spaced apart from the flammable foam, wherein the material includes, optionally is, at least one of a gaseous material, a liquid material, and a solid material.

B13. The test system of any of paragraphs B1-B12, wherein the flammable foam fluidically isolates a portion of a surface of the test article from an ambient gas.

B13.1. The test system of paragraph B13, wherein the ambient gas includes, optionally is, at least one of air, molecular oxygen, a flammable gas, an inert gas, nitrogen, and argon.

B13.2. The test system of any of paragraphs B13-B13.1, further comprising a test chamber that encloses the test article, and wherein the test chamber is filled with the ambient gas.

B14. The test system of any of paragraphs B1-B13.2, wherein the flammable foam covers the test article in a pattern of covered and uncovered regions.

B15. The test system of any of paragraphs B1-B14, wherein the flammable foam covers the test article in a first portion of a surface of the test article.

B15.1. The test system of paragraph B15, further comprising a non-flammable foam, wherein the non-flammable foam covers the test article in a second portion of the surface of the test article, optionally wherein the non-flammable foam is an inert foam.

B15.2. The test system of any of paragraphs B15-B15.1, wherein the test article is uncovered in a second portion of the surface of the test article.

B16. The test system of any of paragraphs B1-B15.2, further comprising a detector.

B16.1. The test system of paragraph B16, wherein the detector includes, optionally is, at least one of a camera, an optical detector, a temperature sensor, a heat sensor, an acoustic sensor, a microphone, a pressure sensor, and an electrical detector.

B16.2. The test system of any of paragraphs B16-816.1, wherein the detector is configured to detect ignition and/or combustion of the flammable foam.

B17. The test system of any of paragraphs B1-B16.2, wherein the flammable foam is configured to ignite and/or combust in the presence of an ignition source.

B17.1. The test system of paragraph B17, wherein the ignition source has an energy of less than 1,000 µJ, less than 500 µJ, less than 300 µJ, less than 200 µJ, less than 150 µJ, less than 100 µJ, less than 50 µJ, greater than 10 µJ, greater than 50 µJ, greater than 100 µJ, greater than 150 µJ, greater than 200 µJ, about 50 µJ, about 100 µJ, about 150 µJ, about 200 µJ, and/or about 300 µJ.

B17.2. The test system of any of paragraphs B17-B17.1, wherein the ignition source includes, optionally is, at least one of an electrical arc, a spark, a hot surface, a hot particle ejection, an electrostatic discharge, and a flame.

B17.3. The test system of any of paragraphs B17-B17.2, wherein the flammable foam is configured to substantially completely react at least one of the fuel and the oxidant in response to the presence of the ignition source.

B17.4. The test system of any of paragraphs B17-B17.3, wherein the flammable foam is configured to rapidly react the fuel and the oxidant in response to the presence of the ignition source.

B18. The test system of any of paragraphs B1-B17.4, further comprising a controlled ignition source.

B18.1. The test system of paragraph B18, wherein the controlled ignition source is in contact with the flammable foam.

B18.2. The test system of any of paragraphs B18-B18.1, wherein the controlled ignition source is configured to ignite and/or combust the flammable foam.

B18.3. The test system of any of paragraphs B18-B18.2, wherein the controlled ignition source includes, optionally is, at least one of a lightning simulator, a heater, a heat source, a flame, an electrical current source, and an electrical arc generator.

B18.4. The test system of any of paragraphs B18-B18.3, wherein the controlled ignition source is configured to deliver an energy of less than 1,000 less than 500 µJ, less than 300 µJ, less than 200 µJ, less than 150 µJ, less than 100 µJ, less than 50 µJ, greater than 10 µJ, greater than 50 µJ, greater than 100 µJ, greater than 150 µJ, greater than 200 µJ, about 50 µJ, about 100 µJ, about 150 µJ, about 200 µJ, and/or about 300 µJ.

B19. The test system of any of paragraphs B1-B18.4, wherein the test article is an aerospace component, and optionally at least one of a fuel system component, a fuel tank, a fuel gauge, a fuel pump, an electrical enclosure, and a wing.

B20. The test system of any of paragraphs B1-B19, wherein the flammable foam is the flammable foam of any of paragraphs C1-C21.4.

B21. The use of the test system of any of paragraphs B1-B20 to test for ignition hazards on a test article.

C1. A flammable foam comprising:
a matrix that defines a plurality of cells;
a trapped gas within the cells;
a fuel; and
an oxidant.

C2. The flammable foam of paragraph C1, wherein the matrix is at least one of a liquid matrix and a solid matrix.

C3. The flammable foam of any of paragraphs C1-C2, wherein the matrix includes a liquid and/or a solid.

C4. The flammable foam of any of paragraphs C1-C3, wherein the matrix includes at least one of the fuel and the oxidant.

C5. The flammable foam of any of paragraphs C1-C4, wherein the matrix is electrically conductive or electrically insulating.

C6. The flammable foam of any of paragraphs C1-05, wherein the matrix includes at least one of a flammable material, a fatty acid, and a wax.

C7. The flammable foam of any of paragraphs C1-C6, wherein the matrix includes at least one of soap, detergent, surfactant, oil, and water.

C8. The flammable foam of any of paragraphs C1-C7, wherein the matrix encloses a plurality of cells.

C9. The flammable foam of any of paragraphs C1-C8, wherein the trapped gas includes at least one of the fuel and the oxidant.

C10. The flammable foam of any of paragraphs C1-C9, wherein the trapped gas includes at least one of a hydrocarbon fuel, a flammable gas, molecular hydrogen, methane, propane, gasoline, and kerosene.

C11. The flammable foam of any of paragraphs C1-C10, wherein the trapped gas includes at least one of molecular oxygen and air.

C12. The flammable foam of any of paragraphs C1-C11, wherein the trapped gas includes a mixture of gases.

C13. The flammable foam of any of paragraphs C1-C12, wherein the flammable foam has a fractional volume of trapped gas of greater than 50%, greater than 60%, greater than 70%, greater than 80%, greater than 90%, greater than 95%, greater than 98%, greater than 99%, greater than 99.5%, greater than 99.9%, less than 99.99%, less than 99.9%, less than 99.5%, less than 99%, less than 98%, and/or less than 95%.

C14. The flammable foam of any of paragraphs C1-C13, wherein the flammable foam includes a plurality of fuels and/or a plurality of oxidants.

C15. The flammable foam of any of paragraphs C1-C14, wherein the fuel is a gas, a liquid, and/or a solid.

C16. The flammable foam of any of paragraphs C1-C15, wherein the oxidant is a gas, a liquid, and/or a solid.

C17. The flammable foam of any of paragraphs C1-C16, wherein the fuel includes, optionally is, at least one of a hydrocarbon fuel, a flammable gas, molecular hydrogen, methane, propane, gasoline, kerosene, wax, fatty acid, an aerosol, a suspension of liquid droplets, and a suspension of solid particles, optionally wherein the solid particles include and/or are at least one of dust, powder, and particulate.

C18. The flammable foam of any of paragraphs C1-C17, wherein the oxidant includes, optionally is, at least one of oxygen, air, molecular oxygen, nitrous oxide, and hydrogen peroxide.

C19. The flammable foam of any of paragraphs C1-C18, wherein the flammable foam is a closed-cell foam and/or an open-cell foam.

C20. The flammable foam of any of paragraphs C1-C19, wherein an average effective diameter of the cells is greater than 10 µm, greater than 50 µm, greater than 100 µm, greater than 200 µm, greater than 500 µm, greater than 1,000 µm, greater than 5,000 µm, greater than 10,000 µm, greater than 20,000 µm, less than 25,000 µm, less than 10,000 µm, less than 1,000 µm, and/or less than 500 µm.

C21. The flammable foam of any of paragraphs C1-C20, wherein the flammable foam is configured to ignite and/or combust in the presence of an ignition source.

C21.1. The flammable foam of paragraph C21, wherein the ignition source has an energy of less than 1,000 µJ, less than 500 µJ, less than 300 µJ, less than 200 µJ, less than 150 µJ, less than 100 less than 50 µJ, greater than 10 µJ, greater than 50 µJ, greater than 100 µJ, greater than 150 µJ, greater than 200 µJ, about 50 µJ, about 100 µJ, about 150 µJ, about 200 µJ, and/or about 300 µJ.

C21.2. The flammable foam of any of paragraphs C21-C21.1, wherein the ignition source includes, optionally is, at least one of an electrical arc, a spark, a hot surface, a hot particle ejection, an electrostatic discharge, and a flame.

C21.3. The flammable foam of any of paragraphs C21-C21.2, wherein the flammable foam is configured to substantially completely react at least one of the fuel and the oxidant in response to the presence of the ignition source.

C21.4. The flammable foam of any of paragraphs C21-C21.3, wherein the flammable foam is configured to rapidly react the fuel and the oxidant in response to the presence of the ignition source.

C22. The use of the flammable foam of any of paragraphs C1-C21.4 to test for ignition hazards on a test article.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of apparatuses and steps of methods disclosed herein are not required of all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A testing method comprising:
applying a flammable foam to at least a portion of a surface of a test article, wherein the flammable foam includes a fuel and an oxidant;
applying an energy discharge to the test article with the flammable foam to create an ignition source along the portion of the surface of the test article, wherein the ignition source includes an electrical arc with an energy of greater than 50 µJ (microjoules); and
determining whether the flammable foam ignited in response to the energy discharge;

2. The testing method of claim 1, further comprising forming the flammable foam.

3. The testing method of claim 2, wherein the forming includes bubbling a gaseous mixture of the fuel and the oxidant through a liquid solution to form the flammable foam, wherein the liquid solution includes at least one of soap, detergent, surfactant, oil, and water.

4. The testing method of claim 2, wherein the forming includes forming trapped gas that includes the fuel and the oxidant in the flammable foam.

5. The testing method of claim 2, wherein forming includes forming trapped gas within the flammable foam to produce a fractional volume of trapped gas of greater than 90%.

6. The testing method of claim 1, wherein the test article has an interior and an exterior, and wherein the applying the flammable foam includes applying the flammable foam to the exterior of the test article.

7. The testing method of claim 6, wherein the applying the energy discharge includes applying the energy discharge to the interior of the test article.

8. The testing method of claim 1, wherein the applying the energy discharge includes applying at least one of a simulated lightning strike, an electrical discharge, an electrical arc, and heat to the test article.

9. The testing method of claim 1, wherein the applying the energy discharge includes applying the energy discharge to the test article at an application site spaced apart from the flammable foam.

10. The testing method of claim 1, wherein the applying the flammable foam includes selectively applying the flammable foam to one or more portions of one or more surfaces of the test article.

11. The testing method of claim 1, wherein the applying the flammable foam includes applying the flammable foam to a first portion of the surface of the test article and leaving a second portion of the surface of the test article free of flammable foam.

12. The testing method of claim 1, wherein the portion of the surface of the test article is a first portion, and further comprising applying a non-flammable foam to a second portion of the surface of the test article.

13. The testing method of claim 1, wherein the determining includes determining a point of origin of ignition of the flammable foam.

14. The testing method of claim 1, wherein the flammable foam includes a liquid matrix.

15. An ignition hazard testing method comprising:
applying a flammable foam to at least a portion of a surface of a fuel system;
applying an energy discharge to a test article with the flammable foam, wherein the test article includes the surface of the fuel system;
determining whether the flammable foam ignited in response to the energy discharge; and
combusting, after the determining, any unreacted flammable foam in contact with the test article by igniting the unreacted flammable foam with a controlled ignition source;
wherein the flammable foam includes a liquid matrix that defines a plurality of cells that enclose trapped gas that includes a fuel and an oxidant, wherein an average effective diameter of the cells is less than 25,000 μm (microns), and wherein the flammable foam has a fractional volume of trapped gas of greater than 90%.

16. An aerospace component test system, comprising:
a flammable foam that includes a fuel, an oxidant, and a liquid matrix, wherein the flammable foam is configured to ignite, and to substantially completely react at least one of the fuel and the oxidant, in response to the presence of an ignition source;
a test article at least partially covered by the flammable foam; and
an energy source configured to discharge energy into the test article;
wherein the test system is configured to detect ignition sources generated on the test article by an energy discharge from the energy source.

17. The aerospace component test system of claim 16, wherein the flammable foam includes trapped gas that includes the fuel and the oxidant.

18. The aerospace component test system of claim 16, wherein the oxidant includes at least one of air and molecular oxygen, and wherein the fuel includes at least one of a hydrocarbon fuel, a flammable gas, molecular hydrogen, methane, propane, gasoline, and kerosene.

19. The aerospace component test system of claim 16, wherein the flammable foam has a fractional volume of trapped gas of greater than 90%.

20. The aerospace component test system of claim 16, wherein the flammable foam includes a plurality of cells that include trapped gas, wherein an average effective diameter of the cells is less than 25,000 μm.

* * * * *